May 28, 1935.　　　K. HERKENBERG　　　2,002,739
EXTENSIBLE ELECTRIC CONDUCTOR.
Filed Dec. 11, 1931
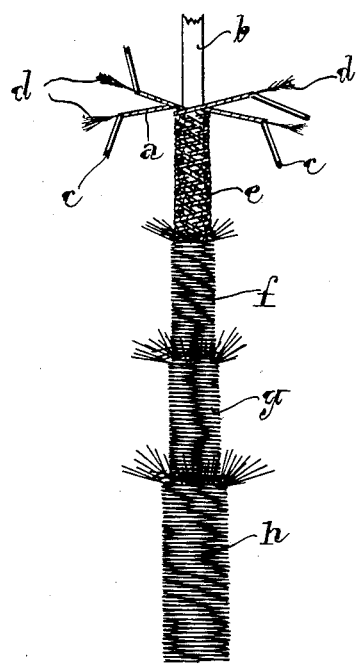
Inventor:
Karl Herkenberg
By B. Singer, atty.

Patented May 28, 1935

2,002,739

UNITED STATES PATENT OFFICE 2,002,739

EXTENSIBLE ELECTRIC CONDUCTOR

Karl Herkenberg, Oberbarmen-Heckinghausen, Germany

Application December 11, 1931, Serial No. 580,385
In Germany December 5, 1930

2 Claims. (Cl. 173—264)

My invention relates to a conductor of electricity, capable of being extended longitudinally to increase its usefulness and improve its applicability especially to movable electric apparatus.

The conductor and the method for production of the extensible electric conductor is represented in the drawing.

The electric conductor consists of separated strands $a$, which are loosely braided together and around and serve to cover a nonconducting core $b$, of rubber or other suitable material. Each of the strands consists of a flat metallic band $c$, for instance of silver, which is wound around an insulating thread $d$, made of silk or other suitable material. The braided conductor $e$ is covered by a tubular cover $f$, consisting of an insulation thread, such for instance as silk, which as here shown is covered by a similar cover $g$, which is covered by the outside covering $h$. The insulation covering may be formed of rubber tubes.

The conductors can be separately connected to manifold cords by a number of contacts.

Having thus described my invention, what I claim is:

1. A longitudinally expansible electric conductor comprising a core of elastic material and conductor elements loosely braided around said core, each of said elements comprising an insulating thread and a flat metallic band spirally wound around the insulating thread.

2. A flexible longitudinally expansible electric conductor cord consisting of an extensible rubber core and conductor elements loosely braided around said core, each of said conductor elements comprising a flexible fibrous thread and a flat metallic band helically wound around said thread, the conductive covering formed by said conductor elements around said rubber core being surrounded by an extensible insulating casing made of threads.

KARL HERKENBERG.